(12) United States Patent
Pivetta (10) Patent No.: US 12,407,711 B2
(45) Date of Patent: Sep. 2, 2025

(54) SAFER PASSWORD MANAGER, TRUSTED SERVICES, AND ANTI-PHISHING PROCESS

(71) Applicant: McAfee, LLC, Santa Clara, CA (US)

(72) Inventor: Martin J. C. Pivetta, Luxemborg (BE)

(73) Assignee: McAfee, LLC, San Jose, CA (US)

( * ) Notice: Subject to any disclaimer, the term of this patent is extended or adjusted under 35 U.S.C. 154(b) by 370 days.

(21) Appl. No.: 16/671,009

(22) Filed: Oct. 31, 2019

(65) Prior Publication Data

US 2020/0067973 A1 Feb. 27, 2020

Related U.S. Application Data

(63) Continuation of application No. 14/757,599, filed on Dec. 23, 2015, now Pat. No. 10,523,702.

(51) Int. Cl.
*H04L 9/40* (2022.01)
*H04L 67/02* (2022.01)

(52) U.S. Cl.
CPC .......... *H04L 63/1441* (2013.01); *H04L 63/10* (2013.01); *H04L 63/1425* (2013.01); *H04L 63/1483* (2013.01); *H04L 63/108* (2013.01); *H04L 67/02* (2013.01)

(58) Field of Classification Search
CPC . H04L 63/1441; H04L 63/1483; H04L 63/10; H04L 63/1425; H04L 67/02; H04L 63/108
See application file for complete search history.

(56) References Cited

U.S. PATENT DOCUMENTS

| | | | |
|---|---|---|---|
| 8,015,606 B1 | 9/2011 | Jevans et al. | |
| 8,108,536 B1 * | 1/2012 | Hernacki | G06F 21/57 709/224 |
| 9,077,715 B1 | 7/2015 | Satish et al. | |
| 2004/0205374 A1 | 10/2004 | Poletto et al. | |
| 2006/0212930 A1 * | 9/2006 | Shull | G06F 21/577 726/10 |
| 2007/0143845 A1 | 6/2007 | Jeong et al. | |
| 2008/0022091 A1 | 1/2008 | Deshpande et al. | |
| 2008/0229382 A1 * | 9/2008 | Vitalos | H04L 63/20 726/1 |
| 2010/0313248 A1 * | 12/2010 | Krivosheev | H04L 9/3226 726/5 |
| 2013/0024577 A1 * | 1/2013 | Krishnaswamy | G06F 21/552 709/227 |
| 2013/0198370 A1 | 8/2013 | Aguchi et al. | |

(Continued)

OTHER PUBLICATIONS

International Searching Authority, "Written Opinion and Search Report," in connection with application No. PCT/US2016/063119, mailed on Mar. 3, 2017, 13 pages.
International Searching Authority, "International Search Report," in connection with application No. PCT /US2016/063100, mailed on Mar. 8, 2017, 3 pages.

(Continued)

*Primary Examiner* — Farid Homayounmehr
*Assistant Examiner* — Suman Debnath
(74) *Attorney, Agent, or Firm* — Hanley, Flight & Zimmerman, LLC (57) ABSTRACT

Preventing anomalous connections includes detecting by a programmable device an attempt by a first device to connect to a second device, detecting a first connection anomaly responsive to characteristics of the first device and characteristics of one or more other devices, and prohibiting a connection between the first device and the second device responsive to detecting the first connection anomaly.

27 Claims, 5 Drawing Sheets

(56) References Cited

U.S. PATENT DOCUMENTS

| | | | |
|---|---|---|---|
| 2014/0173686 A1 | 6/2014 | Kgil et al. | |
| 2015/0095990 A1 | 4/2015 | Ranganathan et al. | |
| 2015/0172314 A1 | 6/2015 | Mononen | |
| 2015/0304292 A1* | 10/2015 | Dulkin | G06F 21/31 726/7 |
| 2015/0341379 A1 | 11/2015 | Lefebvre et al. | |
| 2015/0350234 A1 | 12/2015 | Reno et al. | |
| 2017/0063557 A1* | 3/2017 | Chalmandrier-Perna | H04L 63/0245 |
| 2017/0126705 A1* | 5/2017 | Mirashrafi | H04L 63/102 |

OTHER PUBLICATIONS

International Searching Authority, "Written Opinion of the International Searching Authority," in connection with application No. PCT /US2016/063100, mailed on Mar. 8, 2017, 12 pages.

International Searching Authority, "International Preliminary Report on Patentability", in connection with application No. PCT /US2016/063100, mailed on Jun. 26, 2018, 13 pages.

International Searching Authority, "International Search Report," in connection with application No. PCT/US2016/063119, mailed on Mar. 3, 2017, 3 pages.

International Searching Authority, "Written Opinion of the International Searching Authority," in connection with application No. PCT/US2016/063119, mailed on Mar. 3, 2017, 8 pages.

International Searching Authority, "International Preliminary Report on Patentability", in connection with application No. PCT/US2016/063119 , mailed on Jun. 26, 2018, 9 pages.

United States Patent and Trademark Office, "Non-Final Office Action," issued in connection with U.S. Appl. No. 14/757,599, mailed on Jul. 28, 2017, 11 pages.

United States Patent and Trademark Office, "Final Office Action," issued in connection with U.S. Appl. No. 14/757,599, mailed on Jun. 14, 2018, 13 pages.

United States Patent and Trademark Office, "Non-Final Office Action," issued in connection with U.S. Appl. No. 14/757,599, mailed on Jan. 30, 2019, 12 pages.

United States Patent and Trademark Office, "Notice of Allowance," issued in connection with U.S. Appl. No. 14/757,599, mailed on Jul. 31, 2019, 10 pages.

* cited by examiner

SAFER PASSWORD MANAGER, TRUSTED SERVICES, AND ANTI-PHISHING PROCESS

RELATED APPLICATION

This patent arises from a continuation of U.S. patent application Ser. No. 14/757,599, (now U.S. Pat. No. 10,523, 702) which was filed on Dec. 23, 2015. U.S. patent application Ser. No. 14/757,599 is hereby incorporated herein by reference in its entirety. Priority to U.S. patent application Ser. No. 14/757,599 is hereby claimed.

TECHNICAL FIELD

Embodiments described herein generally relate to data collection, and more specifically to sensor data collection, protection, and value extraction.

BACKGROUND ART

With the rise of the Internet users can access a multitude of devices from their client device. These remote devices can provide valuable services, such as banking, retail, email, social networking, and the like. However, utilizing these types of services comes with risk. As an example, malicious entities may attempt to acquire sensitive information such as credit card numbers, user names, passwords, configuration details, user data, and the like by mimicking a legitimate service.

Current solutions consider a URL, or basic service characteristic as a trustworthy reference point for defining the trustworthiness of the remote connection. However, security holes still exist. Man-in-the-middle attack protection tools leverage local information to detect a compromise or depend on the end-user to spot the issue or know what to do in a situation. Many systems also depend on the first access to a remote destination to determine whether future attempts to access the remote destination should be trusted. Some password managers may merely check a URL of a website prior to providing password information, without further analysis of the server behind the URL.

DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "medium" refers to a single physical medium or a plurality of media that together store what is described as being stored on the medium.

As used herein, the term "network device" can refer to any computer system that is capable of communicating with another computer system across any type of network.

In one or more embodiments, a technique is provided for a safer Password Manager, Trusted Services, and Anti-Phishing process. In one or more embodiments, an intermediary device or system may detect that a first device is attempting to connect to a second device. In one or more embodiments, the first device may be a client device whereas the second device may be a server associated with a web service or website. The intermediary device may identify attempted connection characteristics between the first and second device. For example, the intermediary device may obtain information such as a location of the server the first device is attempting to connect with, an IP address for the second device, security information between the first device and second device, and the like. The intermediary device may also obtain historic connection characteristics between the first and second device. In one or more embodiments, the intermediary device may also attempt to connect to the second device itself to obtain its own connection characteristics with the second device. In addition, in one or more embodiments, the intermediary device may also obtain historic characteristics between other devices and the second device. For example, the intermediary device may obtain connection characteristics arising from connections between other client devices and the web server within a predetermined time period. The intermediary device may determine a trustworthiness of the second device based on the connection characteristics. In one or more embodiments, the intermediary device may look for anomalies in the attempted connection between the first device and the second device, as compared to the other obtained connection characteristics. The intermediary device may either allow or prohibit the connection between the first device and the second device based on the determination.

Figure 1:
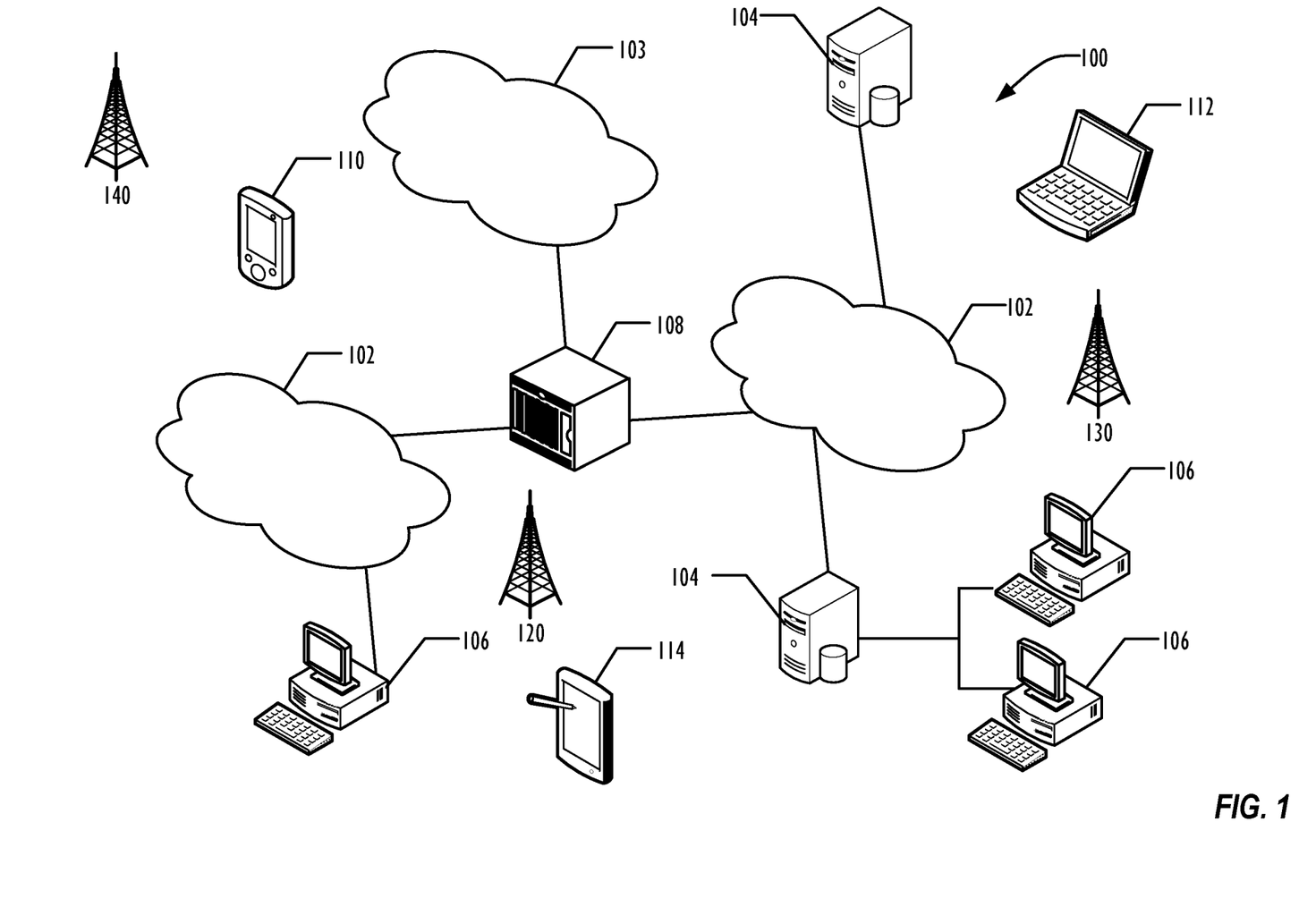
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
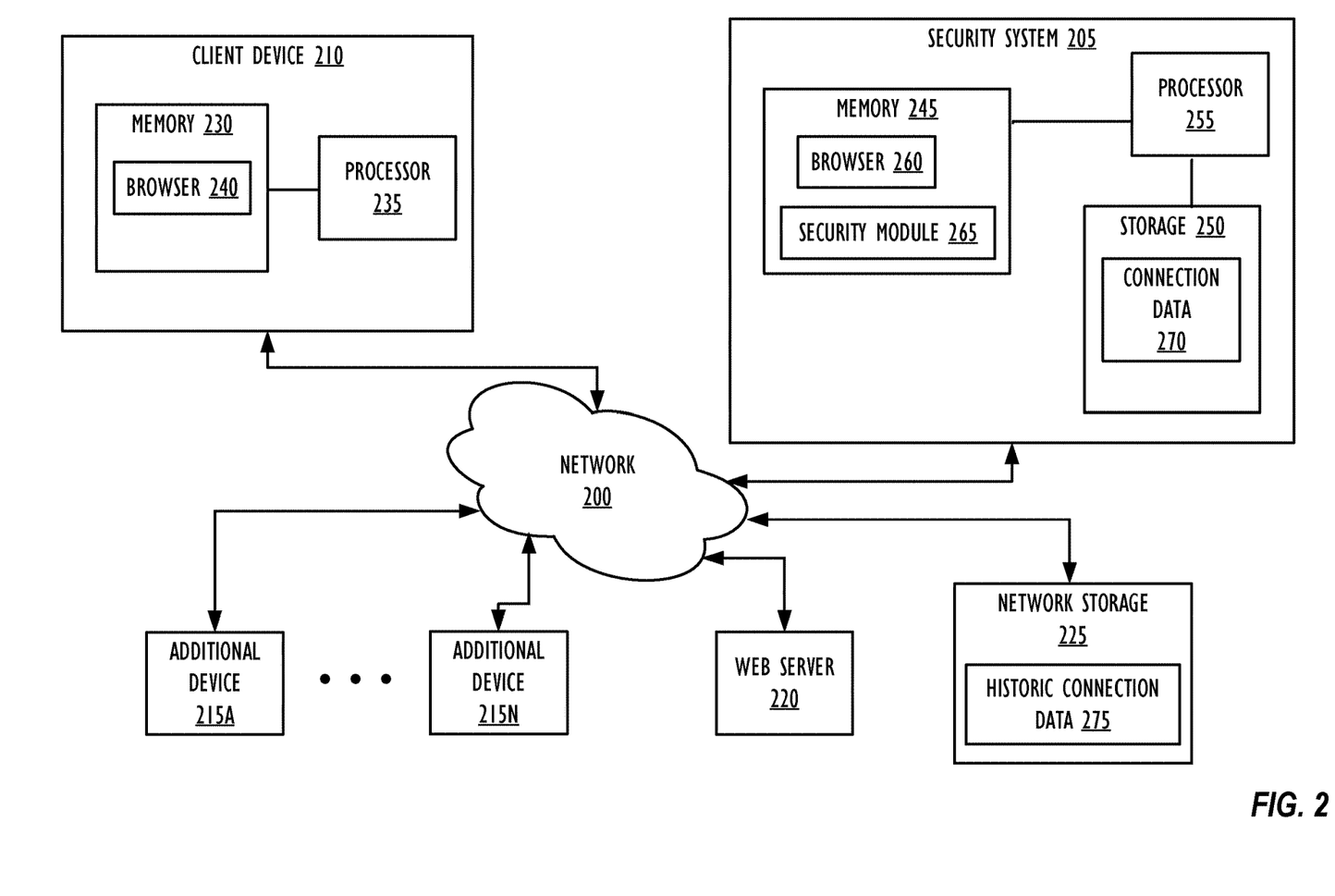
FIG. 2 is a system diagram illustrating a network diagram for a safer Password Manager, Trusted Services, and Anti-Phishing process, according to one or more embodiments.

FIG. 2 is a diagram illustrating a system for safer password managers and anti-phishing process, according to one or more embodiments. FIG. 2 includes several devices connected across network 200. As depicted, network 200 may connect such computer systems as a security system 205, client device 210, additional devices 215A-215N, web server 220, and network storage 225. In one or more embodiments, the functionality of the various components may be differently distributed than the particular depiction of FIG. 2. Network 200 may be any type of computer network, such as a LAN or a corporate network, including a plurality of interconnected networks. For example, Network 200 may include a subset of the devices included in larger network 102 or 103.

In one or more embodiments, the client device 210 may be a computer device with numerous components. Further, in one or more embodiments, the client device 210, as depicted, may be a more constricted device, and have only bare bones components, such as a processor 235 and memory 230. Processor 235 and memory 230 may be operatively connected, for example, over a bus. In one or more embodiments, memory 230 may include software executable by the processor 235, such as a web browser 240. In one or more embodiments, the web browser 240 may allow client device 210 to connect to other devices across network 200.

In one or more embodiments, client device 210, or additional devices 215A-215N could utilize web services across network 200. In one or more embodiments, the various devices, such as client device 210 may connect to a web service, for example, through a web browser 240. In one or more embodiments, the client device 210 or additional devices 215A-215N may connect to web server 220 across network 200. Although web server 220 is depicted as a single server, web server 220 could include any number of network devices utilized to provide a web service.

In one or more embodiments, the security system 205 acts as an intermediary device between at least some of client device 210 and additional devices 215A-215N and web server 220. Although security system 205 is depicted as a single computer system, the various components and functionalities of security system 205 could be distributed among multiple computer systems, servers, and the like. As depicted, security system 205 may include a memory 245, processor 255, and storage 250. Memory 245, processor 255, and storage 250 may be connected, for example, over a bus.

In one or more embodiments, memory 245 includes modules such as a web browser 260 and a security module 265. Browser 260 and security module 265 may be computer code, such as software, executable by processor 255. In one or more embodiments, browser 260 may allow client device 210 to connect to other devices across network 200. For example, browser 260 may allow the security system 205 to connect to web server 220 across network 200.

In one or more embodiments, security module 265 may determine trustworthiness of a destination device on behalf of a requesting device 210. Trustworthiness may be determined in response to detecting an attempted connection between a source device and a destination device. In one or more embodiments, the detection may additionally, or alternatively occur prior to or in conjunction with a password manager automatically entering user data into a web form. In one or more embodiments, the security module 265 may compare connection characteristics from the viewpoint of the requesting device, to connection characteristics of other devices connecting to or that have connected to the destination device. If an anomaly is detected, the destination device may be untrustworthy. For example, in one or more embodiments, security module 265 may detect that client device 210 is attempting to connect to a second device, such as web server 220. Security system 205 may interrupt the connection to gather connection characteristics for the web server 220 to determine whether the web server 220 is trustworthy. Connection characteristics may include, for example, an IP address for the destination, a location of the destination, a certificate for the destination, security checks from the web server 220, and the like. In one or more embodiments, the connection characteristics as viewed from the requesting device are compared to connection characteristics between other devices and the destination device, or historic connection characteristics between the requesting device and the destination device. In one or more embodiments, if an anomaly is detected between the current attempted connection characteristics and the other connection characteristics, the security module 265 may determine that the destination device is untrustworthy.

In one or more embodiments, the security system 205 may itself connect or attempt to connect to the destination device, such as web server 220, to obtain connection characteristics to compare with the attempted connection characteristics between the requesting device and the destination device. Thus, if client device 210 is attempting to connect to web server 220, and the connection is interrupted by security system 205, then security system 205 may connect or attempt to connect to web server 220, for example using browser 260, to collect additional connection characteristics regarding the web server 220.

Security module 265 may also obtain data from other devices that are connected to or have connected to the destination device. For example, security module 265 may obtain connection characteristics from connections between any of additional devices 215A-215N and web server 220. In one or more embodiments, security module 265 may consider only some connection data from other devices. For example, security module 265 may consider connection data only from other devices from within a predetermined time interval. That is, in one or more embodiments, the security module 265 may consider only recent or current connection data, or may compare connection data from a similar time of day. Security module 265 may also consider only connection data from devices from a similar location. For example, if client device 210 is within the United States, and Additional Device 215A is also within the United States, but Additional Device 215N is in Europe, it may be more beneficial to consider connection data only from Additional Device 215A. Security Module 265 may also consider historic connection data between any device, including the security system 205, client device 210, and additional devices 215A-215N and the web server 220.

In one or more embodiments, connection information be stored, for example, locally within a connection data store 270 in storage 250 for the security system 205. In one or more embodiments, connection data may additionally or alternatively be stored remotely, such as in network storage 225, as depicted by historic connection data 275. Connection data may be stored in any kind of file structure, such as a database. Further, connection data may be stored for any device connecting to a destination. That is connection data 270 or historic connection data 275 may, for example, include connection data from any of client device 210, security system 205, and additional devices 215A-215N connecting to web server 220. In one or more embodiments, the historic connection data relating to a particular destination may be used to determine trends regarding the destination. For example, aggregated connection data regarding web server 220 may indicate a reliability of an IP address associated with web server 220.

Figure 3:
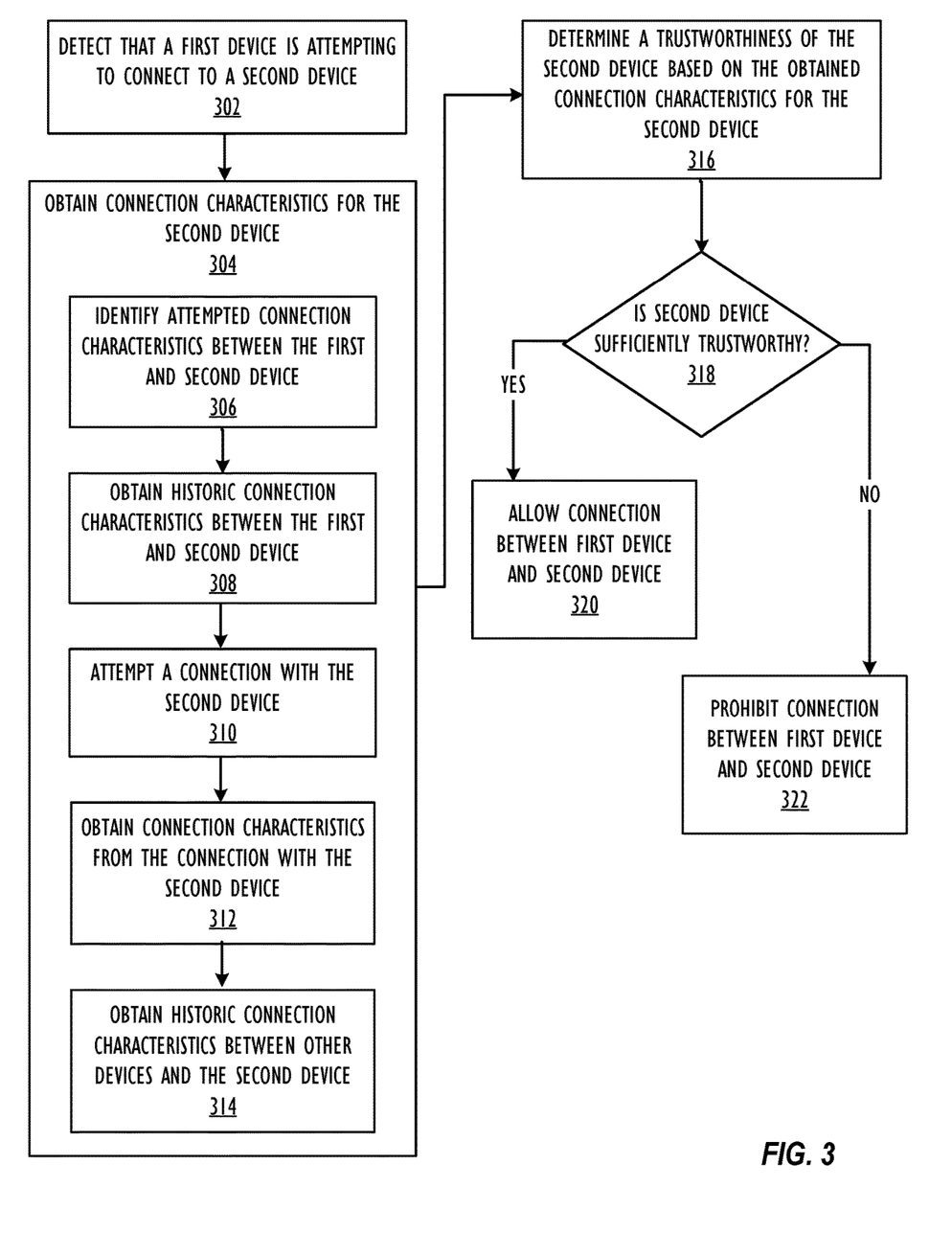
FIG. 3 is a flow diagram illustrating a method for providing a safer Password Manager, Trusted Services, and Anti-Phishing process, according to one or more embodiments.

FIG. 3 is a flow diagram illustrating a technique for safer password managers and anti-phishing process. In one or more embodiments, the various steps of the flow diagram may occur in an intermediary device, such as security system 205 depicted in FIG. 2. In one or more embodiments, at least some of the actions depicted in the flow diagram may be performed, for example, by security module 265 of security system 205. Although the various steps are depicted in a particular order, and performed by particular components, in one or more embodiments, the various steps may be performed in a different order. Further, in one or more embodiments, steps may be omitted or added, or performed by different components than those depicted in FIG. 3.

The flow diagram begins at 302, and security system 205 detects that a first device is attempting to connect to a second device. As an example, client device 210 could be attempting to connect to web server 220. In one or more embodiments, client device 210 may indicate to security system 205 that it is attempting to connect to web server 220. For example, browser 240 may include a security plugin that prevents immediate connection to some or all remote devices prior to alerting security system 205 and perhaps receiving permission from security system 205.

The flow diagram continues at 304, and the security module 265 obtains connection characteristics for the second device. As described above, the connection characteristics can be obtained from a number of source devices that have connected or attempted to connect to the same second device. As depicted in the flow diagram, obtaining connection characteristics can include a number of steps, although in one or more embodiments, any combination of those shown may be utilized to obtain connection characteristics for the second device.

Obtaining connection characteristics for the second device may include, at 306, the security module 265 identifying attempted connection characteristics between the first and second device. For example, if client device 210 is attempting to connect to web server 220, security module 265 may collect connection information from the point of view of the client device 210. That is, security module 265 may collect information such as a location of the client device 210, a location of the web server 220, a certificate the client device 210 obtains from the web server 220, a type of server of the web server 220 (such as operating system characteristics), TCP IP headers, and the like. The flow diagram continues at 308, and the security module 265 may obtain historic connection characteristics between the first device and the second device. In one or more embodiments, the historic connection characteristics may be stored locally, such as in connection data 270, or remotely, such as in historic connection data 275. In one or more embodiments, historic connection characteristics between the first device and the second device may be useful for determining, for example, if this particular connection between the first and second device includes an anomaly. As an example, if the first device always connects to a web server in the United States, but now the web server appears to be in China, an anomaly may be detected.

The flow diagram continues at 310, and the security system 205 attempts a connection to the second device, such as web server 220. In one or more embodiments, the security system 205 connects to web server 220 so that at 312, security system 205 can obtain additional connection characteristics for the second device. That is, at 312, the security system 205 may collect its own connection characteristics for the second device from the point of view of the security system. In one or more embodiments, the security system 205 may collect the connection characteristics in real time, or may alternatively, or additionally, rely on historic connection results from connections between the security system 205 and web server 220. That is, in one or more embodiments, security system 205 may occasionally or periodically connect to web server 220 for purposes of gathering connection data.

The flow diagram continues at 314, and the security module 265 may additionally collect connection characteristics from connections or attempted connections between other devices and the second device. For example, security module 265 may obtain connection data from connections between additional devices 215A-215N and web server 220. The connection characteristics may be connection characteristics from current connections and obtained in real time, or may be obtained from storage of historic connection data 275. For example, security module 265 may obtain connection characteristics from connections between additional devices 215A-215N and web server 220 within connection data 270 and historic connection data 275.

The flow diagram continues at 316, and the security system 205 determines a trustworthiness of the second device based on the obtained connection characteristics for the second device. For example, security module 265 may determine the trustworthiness of web server 220 based on any combination of connection characteristics obtained from steps 306-314, as described above. In one or more embodiments, trustworthiness may be defined on a scale, and if the trustworthiness matches a particular threshold on the trustworthiness scale, the second device may be determined to be trustworthy. In one or more embodiments, trustworthiness may be determined by detecting anomalies in the current connection characteristics between the first and second device and the other obtained connection characteristics.

The flow diagram continues at 318, and if the second device is determined to be sufficiently trustworthy, then the flow diagram continues at 320 and the security system 205 allows the connection between the first device and the second device. However, if at 318 it is determined that the second device is not sufficiently trustworthy, then the flow diagram continues at 322 and the security system 205 prohibits the connection between the first and second device. In one or more embodiments, the security system 205 may block the connection between the first device and the second device, or the security system 205 may transmit an alert message to client device 210 to make client device 210 aware that the second device is not sufficiently trustworthy. In one or more embodiments, the security system 205 may prevent other applications, such as password managers, from transmitting data to the second device. Further, in one or more embodiments, the security system 205 may take some other action in response to determining that the second device is determined to be untrustworthy.

Figure 4:
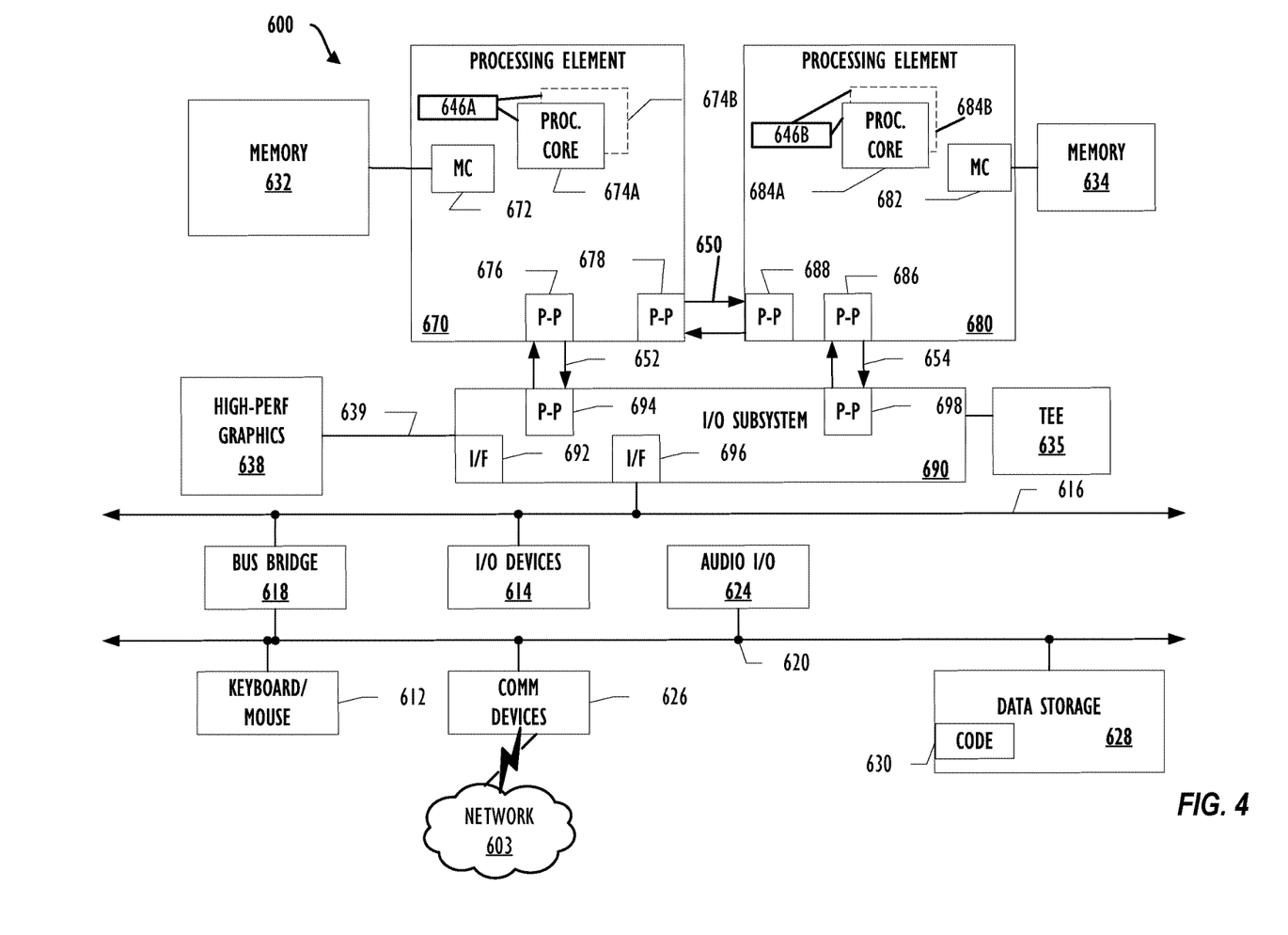
FIG. 4 is a diagram illustrating a computing device for use with techniques described herein according to one embodiment.

Referring now to FIG. 4, a block diagram illustrates a programmable device 600 that may be used within a computer device, such as security system 205, client device 210, or any other computer system described above in accordance with one or more embodiments. The programmable device 600 illustrated in FIG. 4 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 4 may be implemented as a multi-drop bus rather than point-to-point interconnects.

As illustrated in FIG. 4, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-3. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (PP) interconnects 676 and 678. Similarly, second processing element 680 may include a MC 682 and P-P interconnects 686 and 688. As illustrated in FIG. 4, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 4, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 4, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 4, a system may implement a multi-drop bus or another such communication topology. Although links 616 and 620 are illustrated as busses in FIG. 4, any desired type of link may be used. Also, the elements of FIG. 4 may alternatively be partitioned using more or fewer integrated chips than illustrated in FIG. 4.

Figure 5:
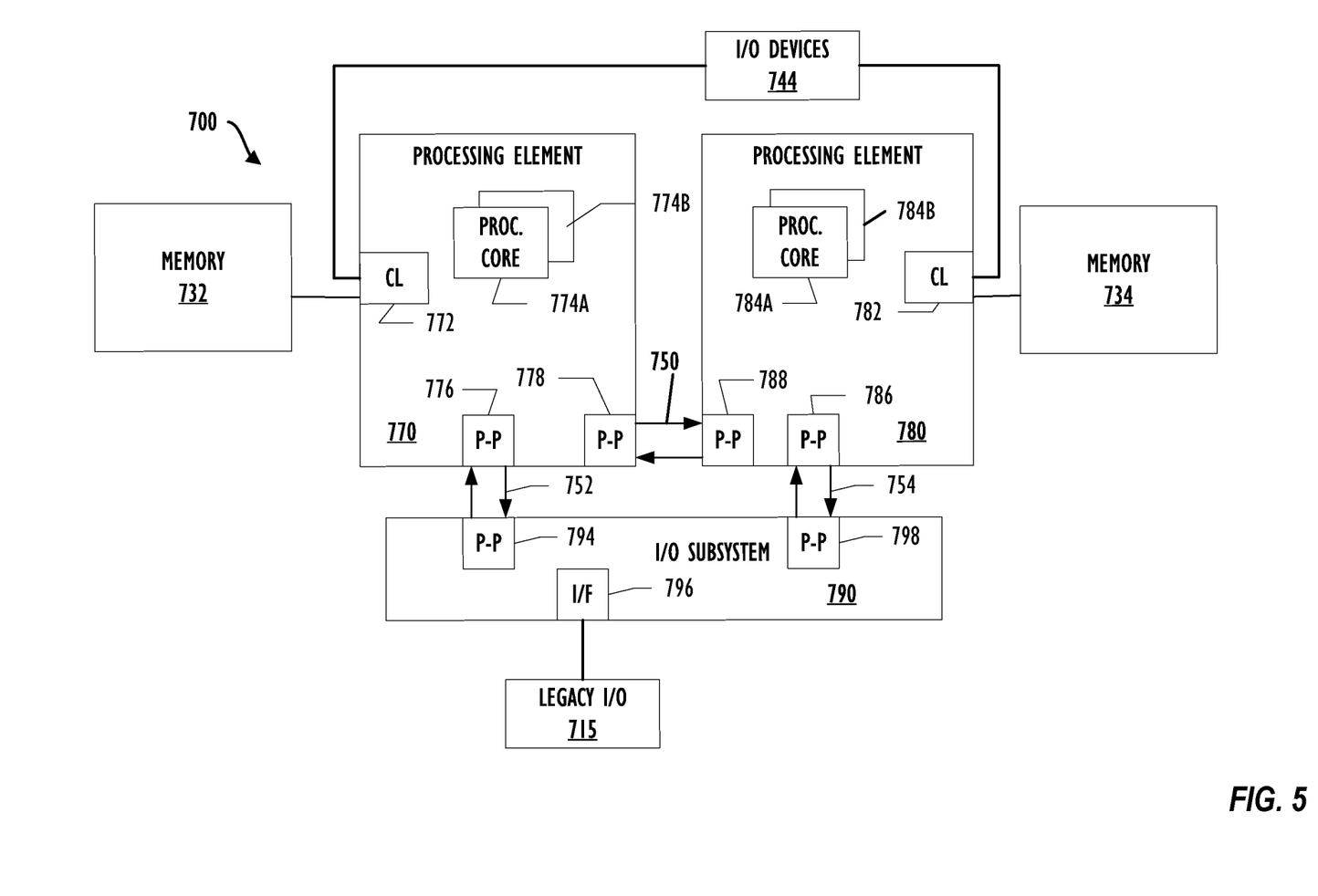
FIG. 5 is a block diagram illustrating a computing device for use with techniques described herein according to another embodiment.

Referring now to FIG. 5, a block diagram illustrates a programmable device 700 according to another embodiment. Certain aspects of FIG. 4 have been omitted from FIG. 5 in order to avoid obscuring other aspects of FIG. 5.

FIG. 5 illustrates that processing elements 770, 780 may include integrated memory and I/O control logic ("CL") 772 and 782, respectively. In some embodiments, the 772, 782 may include memory control logic (MC) such as that described above in connection with FIG. 4. In addition, CL 772, 782 may also include I/O control logic. FIG. 5 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 5 as processor cores 774A, 774B, 784A, and 784B. As illustrated in FIG. 5, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 4 and 5 are schematic illustrations of embodiments of programmable devices which may be utilized to implement various embodiments discussed herein. Various components of the programmable devices depicted in FIGS. 4 and 5 may be combined in a system-on-a-chip (SoC) architecture.

In one or more embodiments, the features described above provide safer password managers and anti-phishing processes. A security system may act as an intermediary to provide an extra layer of protection such that even if security products installed on a device identify a remote connection as trustworthy, the security system does an additional check, utilizing connection information from not only the requesting device but other devices that have connected to the remote device. Further, in one or more embodiments, the security system may prevent man in the middle attacks by leveraging aggregated connection information for a destination and comparing the aggregated connection information with the data as viewed from the requesting device.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: detect that a first device is attempting to connect to a second device; determine a level of trustworthiness of the second device based on characteristics of the first device and characteristics of additional devices connected to the second device; and in response to determining that the second device is not sufficiently trustworthy, prevent the first device from connecting to the second device.

In Example 2 the subject matter of Example 1 optionally includes further comprising instructions that when executed cause the machine to: attempt a connection between the machine and the second device, wherein the instructions that when executed cause the machine to determine a level of trustworthiness further comprise instructions that when executed cause the machine to determine a level of trustworthiness further based on characteristics of the attempted connection between the machine and the second device.

In Example 3 the subject matter of any of Examples 1-2 optionally includes wherein the characteristics of the first device comprise characteristics of previous connections between the first device and the second device.

In Example 4 the subject matter of any of Examples 1-2 optionally includes wherein the characteristics of the additional devices comprise characteristics of additional devices that have connected to the second device within a predetermined prior time period.

In Example 5 the subject matter of any of Examples 1-2 optionally includes wherein the instructions that when executed cause the machine to determine the level of trustworthiness comprise instructions that when executed cause the machine to determine a level of trustworthiness further based on a certificate for the second device.

In Example 6 the subject matter of any of Examples 1-2 optionally includes wherein the instructions that when executed cause the machine to determine the level of trustworthiness further comprise instructions that when executed determine a reliability of an IP address associated with the second device.

In Example 7 the subject matter of any of Examples 1-2 optionally includes wherein the characteristics of the additional devices comprise characteristics of connections between the additional devices and the second device.

In Example 8 the subject matter of Example 7 optionally includes wherein the connections between the additional devices and the second device comprise connections between the additional devices and the second device during a predetermined prior time period.

Example 9 is a method of preventing anomalous connections, comprising: detecting by a programmable device an attempt by a first device to connect to a second device; detecting a first connection anomaly responsive to characteristics of the first device and characteristics of one or more other devices; and prohibiting a connection between the first device and the second device responsive to detecting the first connection anomaly.

In Example 10 the subject matter of Example 9 optionally includes wherein the characteristics of the one or more other devices comprise characteristics of connections between the one or more other devices and the second device.

In Example 11 the subject matter of Example 10 optionally includes wherein the connections between the one or more other devices and the second device comprise connections between the one or more other devices and the second device that were established during a predetermined prior time interval.

In Example 12 the subject matter of any of Examples 9-11 optionally includes further comprising: attempting a second connection between the programmable device and the second device, wherein detecting the first connection anomaly comprises detecting the first connection anomaly responsive to characteristics of the second connection, the characteristics of the first device, and the characteristics of the one or more other devices.

In Example 13 the subject matter of Example 12 optionally includes wherein detecting the first connection anomaly further comprises detecting the first connection anomaly responsive to characteristics of prior connections between the programmable device and the second device.

In Example 14 the subject matter of any of Examples 9-11 optionally includes wherein the characteristics of the first device comprise characteristics of prior connections between the first device and the second device.

In Example 15 the subject matter of any of Examples 9-11 optionally includes wherein detecting the first connection anomaly comprises detecting the first connection anomaly responsive to the characteristics of the first device, the characteristics of the one or more other devices; and the characteristics of the second device.

In Example 16 the subject matter of Example 15 optionally includes wherein the characteristics of the second device comprise characteristics of a certificate associated with the second device.

Example 17 is a system for detecting connection anomalies, comprising: one or more processors; a memory on which are stored instructions, comprising instructions that when executed cause at least some of the one or more processors to: detect that a first device is attempting to connect to a second device; determine a level of trustworthiness of the second device based on characteristics of the first device and characteristics of additional devices previously connected to the second device; and take an action regarding the attempt by the first device to connect to the second device responsive to the determined level of trustworthiness of the second device.

In Example 18 the subject matter of Example 17 optionally includes wherein the instructions further comprise instructions that when executed cause at least some of the one or more processors to: attempt a connection between the system and the second device, wherein the instructions that when executed cause at least some of the one or more processors to determine a level of trustworthiness further comprise instructions that when executed cause at least some of the one or more processors to determine the level of trustworthiness further based on characteristics of the attempted connection between the system and the second device.

In Example 19 the subject matter of any of Examples 17-18 optionally includes wherein the characteristics of the first device comprise characteristics of previous connections between the first device and the second device.

In Example 20 the subject matter of any of Examples 17-18 optionally includes wherein the characteristics of the additional devices comprise characteristics of additional devices that have connected to the second device within a predetermined prior time period.

In Example 21 the subject matter of any of Examples 17-18 optionally includes wherein the instructions that when executed cause at least some of the one or more processors to determine a level of trustworthiness comprise instructions that when executed cause at least some of the one or more processors to determine the level of trustworthiness further based on a certificate for the second device.

In Example 22 the subject matter of any of Examples 17-18 optionally includes wherein the instructions that when executed cause at least some of the one or more processors to determine a level of trustworthiness further comprise instructions that when executed cause at least some of the one or more processors to determine a reliability of an IP address associated with the second device.

In Example 23 the subject matter of any of Examples 17-18 optionally includes wherein the characteristics of the additional devices comprise characteristics of connections between the additional devices and the second device.

In Example 24 the subject matter of Example 23 optionally includes wherein the connections between the additional devices and the second device comprise connections between the additional devices and the second device during a predetermined prior time period In Example 25 the subject matter of any of Examples 17-18 optionally includes where the instructions then when executed cause at least some of the one or more processors to take an action comprise instructions that when executed cause at least some of the one or more processors to prevent the first device from connecting to the second device.

Example 26 is a method for detecting connection anomalies, comprising: detecting that a first device is attempting to connect to a second device; determining a level of trustworthiness of the second device based on characteristics of the first device and characteristics of additional devices previously connected to the second device; and taking an action regarding the attempt by the first device to connect to the second device responsive to the determined level of trustworthiness of the second device.

In Example 27 the subject matter of Example 26 optionally includes further comprising: attempting a connection between the system and the second device, wherein determining the level of trustworthiness is further based on characteristics of the attempted connection between the system and the second device.

In Example 28 the subject matter of any of Examples 26-27 optionally includes wherein the characteristics of the first device comprise characteristics of previous connections between the first device and the second device.

In Example 29 the subject matter of any of Examples 26-27 optionally includes wherein the characteristics of the additional devices comprise characteristics of additional devices that have connected to the second device within a predetermined prior time period.

In Example 30 the subject matter of any of Examples 26-27 optionally includes wherein determining a level of trustworthiness further comprises determining the level of trustworthiness further based on a certificate for the second device.

In Example 31 the subject matter of any of Examples 26-27 optionally includes wherein determining a level of trustworthiness further comprises determining a reliability of an IP address associated with the second device.

In Example 32 the subject matter of any of Examples 26-27 optionally includes wherein the characteristics of the additional devices comprise characteristics of connections between the additional devices and the second device.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. At least one storage device or storage disk comprising instructions to cause one or more processor circuits of a security device to at least:
   prevent a first communication from reaching a receiving device, the first communication from a sending device and addressed to the receiving device;
   initiate sending of a second communication from the security device to the receiving device;
   collect connection characteristics associated with the second communication between the security device and the receiving device;
   determine a level of trustworthiness of the receiving device based on the connection characteristics associated with the second communication between the security device and the receiving device;
   compare the level of trustworthiness of the receiving device to a threshold of trustworthiness; and
   after a determination that the level of trustworthiness of the receiving device meets the threshold, (1) notify the sending device that a third communication addressed to the receiving device is permitted and (2) permit the third communication to reach the receiving device.

2. The storage device or storage disk of claim 1, wherein at least one of the one or more processor circuits is to initiate the sending of the second communication within a predetermined interval of the first communication.

3. At least one storage device or storage disk comprising instructions to cause one or more processor circuits of a security device to at least:
   prevent a first communication from reaching a receiving device, the first communication from a sending device and addressed to the receiving device;
   initiate sending of a second communication from the security device to the receiving device;
   collect connection characteristics associated with the second communication between the security device and the receiving device;
   determine a level of trustworthiness of the receiving device based on the connection characteristics associated with the second communication between the security device and the receiving device;
   compare the level of trustworthiness of the receiving device to a threshold of trustworthiness; and
   after a determination that the level of trustworthiness of the receiving device does not meet the threshold, disallow a third communication from the sending device from reaching the receiving device.

4. The storage device or storage disk of claim 3, wherein the instructions cause at least one of the one or more processor circuits of the security device to disallow the third communication between the receiving device and the sending device by blocking at least one communication from the sending device to the receiving device.

5. The storage device or storage disk of claim 3, wherein the instructions cause at least one of the one or more processor circuits of the security device to disallow the third communication between the receiving device and the sending device by preventing an application of the sending device from transmitting data to the receiving device.

6. The storage device or storage disk of claim 3, wherein the instructions cause at least one of the one or more processor circuits of the security device to instruct the sending device not to connect to the receiving device.

7. The storage device or storage disk of claim 3, wherein the connection characteristics are first connection characteristics, and at least one of the one or more processor circuits is to determine the level of trustworthiness of the receiving device based on the first connection characteristics associated with the second communication and second connection characteristics associated with a fourth communication including a peer device and the receiving device.

8. The storage device or storage disk of claim 3, wherein the connection characteristics are first connection characteristics, and at least one of the one or more processor circuits is to determine the level of trustworthiness based on a comparison between the first connection characteristics associated with the second communication and second connection characteristics associated with the first communication.

9. The storage device or storage disk of claim 3, wherein at least one of the one or more processor circuits is to initiate the sending of the second communication within a predetermined interval of the first communication.

10. A security device comprising:
    memory;
    instructions; and
    one or more processor circuits to execute the instructions to:
      prevent a first communication from reaching a receiving device, the first communication from a sending device and addressed to the receiving device;
      cause the security device to establish a second communication with the receiving device;
      collect connection characteristics associated with the second communication between the security device and the receiving device;
      determine a level of trustworthiness of the receiving device based on the connection characteristics associated with the second communication between the security device and the receiving device, the connection characteristics including a location of the receiving device; and
      after a determination that the level of trustworthiness of the receiving device meets a threshold of trustworthiness, (1) notify the sending device that a new communication addressed to the receiving device is permitted and (2) permit the new communication to reach the receiving device.

11. The security device of claim 10, wherein at least one of the one or more processor circuits is to, based on determining that the receiving device does not meet the threshold of trustworthiness, prevent the sending device from establishing the new communication with the receiving device.

12. The security device of claim 11, wherein at least one of the one or more processor circuits is to prevent the sending device from establishing the new communication with the receiving device by blocking at least one communication from the sending device to the receiving device.

13. The security device of claim 11, wherein at least one of the one or more processor circuits is to prevent the sending device from establishing the new communication with the receiving device by preventing transmission of data from the sending device to the receiving device.

14. The security device of claim 10, wherein at least one of the one or more processor circuits is to, based on determining that the receiving device does not meet the threshold of trustworthiness, instruct the sending device to not connect to the receiving device.

15. The security device of claim 10, wherein the connection characteristics are first connection characteristics, and at least one of the one or more processor circuits is to determine the level of trustworthiness of the receiving device based on the first connection characteristics associated with the second communication and second connection characteristics associated with a fourth communication including a peer device and the receiving device.

16. The security device of claim 10, wherein the connection characteristics are first connection characteristics, and at least one of the one or more processor circuits is to determine the level of trustworthiness based on a comparison between the first connection characteristics associated with the second communication and second connection characteristics associated with the first communication.

17. A method comprising:
preventing, by executing an instruction with at least one processor circuit of a security device, a first communication from reaching a receiving device, the first communication from a sending device and addressed to the receiving device;
establishing, by executing an instruction with one or more of the at least one processor circuit, a second communication between the security device and the receiving device;
collecting, by executing an instruction with one or more of the at least one processor circuit, connection characteristics associated with the second communication between the security device and the receiving device;
determining, by executing an instruction with one or more of the at least one processor circuit, a level of trustworthiness of the receiving device based on a comparison between the connection characteristics associated with the second communication and a threshold of trustworthiness; and
after determining that the level of trustworthiness meets the threshold, (1) notifying by executing an instruction with one or more of the at least one processor circuit, the sending device that a third communication addressed to the receiving device is permitted and (2) permitting, by executing an instruction with one or more of the at least one processor circuit, the third communication to reach the receiving device.

18. The method of claim 17, further including, after determining that the receiving device does not meet the threshold of trustworthiness, preventing the sending device from establishing the third communication with the receiving device.

19. The method of claim 18, further including delaying the sending device from establishing the third communication with the receiving device by blocking at least one communication from the sending device to the receiving device.

20. The method of claim 18, further including delaying the sending device from establishing the third communication with the receiving device by preventing a transmission of data from the sending device to the receiving device.

21. The method of claim 17, further including, based on determining that the receiving device does not meet the threshold of trustworthiness, instructing the sending device to not connect to the receiving device.

22. The method of claim 17, wherein the connection characteristics are first connection characteristics, and the method includes determining the level of trustworthiness of the receiving device based on the first connection characteristics associated with the second communication and second connection characteristics associated with a fourth communication including a peer device and the receiving device.

23. The method of claim 17, wherein the connection characteristics are first connection characteristics, the comparison is a first comparison, and the method includes determining the level of trustworthiness based on a second comparison between the first connection characteristics associated with the second communication and second connection characteristics associated with the first communication.

24. A security device comprising:
communication circuitry;
instructions; and
one or more processor cores to execute the instructions to:
prevent a first communication from reaching a receiving device, the first communication from a sending device and addressed to the receiving device;
initiate sending of a second communication the security device to the receiving device;
collect one or more characteristics associated with the second communication between the security device and the receiving device;
determine a level of trustworthiness of the receiving device based on the one or more characteristics associated with the second communication between the security device and the receiving device; and
after a determination that the level of trustworthiness of the receiving device meets a threshold of trustworthiness, (1) cause the communication circuitry to transmit a message to notify the sending device that a third communication addressed to the receiving device is permitted and (2) permit the third communication to reach the receiving device.

25. The security device of claim 24, wherein at least one of the one or more processor cores is to, based on determining that the receiving device does not meet the threshold of trustworthiness, prevent the sending device from establishing the third communication with the receiving device.

26. The security device of claim 24, wherein the one or more characteristics are one or more first characteristics, and at least one of the one or more processor cores is to determine the level of trustworthiness of the receiving device based on the one or more first characteristics associated with the second communication and one or more second characteristics associated with a fourth communication including a peer device and the receiving device.

27. The security device of claim 24, wherein the one or more characteristics are one or more first characteristics, and at least one of the one or more processor cores is to determine the level of trustworthiness based on a comparison between the one or more first characteristics associated with the second communication and one or more second characteristics associated with the first communication.

* * * * *